United States Patent
Barnhart et al.

(10) Patent No.: US 7,080,928 B2
(45) Date of Patent: *Jul. 25, 2006

(54) ELECTRONICALLY CONTROLLED AIRCRAFT RETRACTABLE LANDING LIGHT WITH MANUAL RETRACTION CAPABILITY

(75) Inventors: Brian J. Barnhart, New Carlisle, OH (US); Craig E. Giffen, Hilliard, OH (US); Scott E. Hamilton, North Lewisburg, OH (US); Saed M. Mubaslat, Miamisburg, OH (US)

(73) Assignee: Honeywell International Inc., Morristown, NJ (US)

( * ) Notice: Subject to any disclaimer, the term of this patent is extended or adjusted under 35 U.S.C. 154(b) by 145 days.

This patent is subject to a terminal disclaimer.

(21) Appl. No.: 10/153,945

(22) Filed: May 23, 2002

(65) Prior Publication Data

US 2003/0107899 A1    Jun. 12, 2003

Related U.S. Application Data

(60) Provisional application No. 60/339,635, filed on Dec. 12, 2001.

(51) Int. Cl.
*B60Q 2/02* (2006.01)

(52) U.S. Cl. ............... 362/465; 362/466; 362/472; 362/287; 315/82

(58) Field of Classification Search .......... 362/464, 362/465, 466, 470, 472, 526, 527, 286, 287, 362/467; 315/208, 307, 311, 0.82

See application file for complete search history.

(56) References Cited

U.S. PATENT DOCUMENTS

| | | | |
|---|---|---|---|
| 3,641,261 A | 2/1972 | Chaplin et al. | |
| 4,115,841 A | 9/1978 | Alexander | |
| 4,212,050 A | 7/1980 | Trenkler | |
| 4,233,652 A | 11/1980 | Oswald | |
| 4,353,110 A | 10/1982 | Ellis | |
| 4,916,445 A | 4/1990 | Crossley | |
| 5,293,304 A | 3/1994 | Godfrey | |
| 5,355,131 A | 10/1994 | Metz et al. | |
| 5,369,557 A | 11/1994 | Ronney | |
| D361,142 S | 8/1995 | Allred | |
| 5,580,148 A | 12/1996 | Liao | |
| 5,584,560 A | 12/1996 | Gosswiller et al. | |
| 5,589,901 A | 12/1996 | Means | |
| 5,806,956 A | 9/1998 | Hyun-Jo | |
| 6,191,547 B1 | 2/2001 | Fricke et al. | |
| 6,315,435 B1 | 11/2001 | Hamilton et al. | |
| 6,608,445 B1 * | 8/2003 | Melvin et al. | 315/82 |
| 6,669,351 B1 * | 12/2003 | Shea et al. | 362/153.1 |

* cited by examiner

*Primary Examiner*—Thomas M. Sember
(74) *Attorney, Agent, or Firm*—Birch, Stewart, Kolasch & Birch, LLP

(57) ABSTRACT

An electronically controlled retractable landing light (100) for use with aircraft. A controller (106) compares the commanded position of a lighthead (108) by means of a contactless absolute position sensor (212). Operation of a brake (111), motor (110), and lamp (112) is controlled by a control unit (210). Electrical power to the brake (111), motor (110), and lamp (112) is slowly applied and removed to reduce electromagnetic emissions and extend the service life of a power stage (208), brake (111), motor (110), and lamp (112). The lighthead (108) may be manually stowed in the event of a fault.

26 Claims, 3 Drawing Sheets

ELECTRONICALLY CONTROLLED AIRCRAFT RETRACTABLE LANDING LIGHT WITH MANUAL RETRACTION CAPABILITY

CROSS REFERENCE

This application is related to a application entitled "Efficient Solid State Switching and Control System for Retractable Landing Lights," by inventors D. Melvin and S. Mubaslat, filed concurrently with the present application, and issued as U.S. Pat. No. 6,608,445.

This application claims the benefit of U.S. Provisional Application No. 60/339,635 filed Dec. 12, 2001 entitled "Electronically Controlled Retractable Landing Light."

BACKGROUND OF THE INVENTION

1. Field of the Invention

This invention relates to aircraft retractable landing lights. Specifically, the invention is directed to an aircraft retractable landing light having electronic position control and switching with manual lighthead retraction capability.

2. Description of the Related Art

Landing lights are mounted to aircraft to illuminate the area forward of the aircraft during night operations on taxiways and runways. A "retractable landing light" is a remotely controlled, articulating light that can be stowed flush with the outside surface of the aircraft when not in use, reducing aerodynamic drag on the aircraft. The retractable landing light's lamp is housed in a lighthead. The lighthead is in turn hingedly affixed to a housing assembly, which is mounted to the airframe. The lighthead is extended for use and retracted to a stowed position by means of an unsealed torque-amplifying transmission mechanism driven by an electric motor. The lighthead is held in place by an electromechanical brake. When the flight crew actuates a remote control to an "Extend" position, the brake is released by applying electrical power to the brake's coil. Electrical power is simultaneously applied to the motor, causing the motor's output shaft to turn, driving the transmission. The lighthead then extends to a predetermined position, aiming the lamp to illuminate the area forward of the aircraft. Power is then removed from the motor and the brake, causing the lighthead to stop moving. The brake re-engages, preventing the motor's output shaft from turning. The holding force of the brake is amplified by the transmission mechanism, effectively holding the lighthead in position against the force of the windstream encountered by an aircraft in flight. The motor and brake are also simultaneously activated when the remote control is placed in a "Stow" position. However, power is applied to the motor so as to cause the motor's output shaft to rotate counter to the direction used to extend the lighthead. When the lighthead is flush with the surface of the aircraft, power is again removed simultaneously from the motor and brake, holding the lighthead in the stowed position. The lamp may be automatically switched on by means of a limit switch after the lighthead is extended and then switched off when the lighthead is retracted. Alternatively, the lamp may be manually controlled by a switch in the cockpit.

Prior retractable landing lights suffer from a number of shortcomings. In particular, prior retractable landing lights utilize electromechanical limit switches to detect the lighthead's position, and electromechanical relays for control of the motor, brake, and lamp. Electromechanical switches and relays have limited operational life due to mechanical wear. In addition, these switches and relays generate electromagnetic interference due to arcing at their electrical contacts. Electromechanical switches also hinder the ability to change the operational characteristics of the retractable landing light. It is desirable to change such operational characteristics as the extension angle of the lighthead and the switching sequence of the lamp, brake, and motor in order to meet the particular needs of various models of aircraft.

Another drawback of electromechanical switches is that they do not lend themselves to precise position control due to the limited resolution of actuators. Precise position control is desirable to aim the lamp at the proper angle. If the lighthead is extended to a smaller angle than desired, the lamp will be aimed too close to the aircraft. Conversely, if the lighthead extension angle is too great, the lamp will be aimed too far ahead of the aircraft. Both conditions result in a reduction in visibility for the flight crew. Attempts to implement more precise mechanical position controls in prior retractable landing lights have resulted in more complex actuators, reducing the reliability of the retractable landing light. Mechanical wearing of the actuators, combined with changes in setting due to vibration, also contributes to shifting of the lamp extension angle over time, requiring regular maintenance to re-adjust the lighthead to the proper angle.

A further disadvantage of electromechanical switches and relays is that current flow through the motor, brake and lamp is limited only by the capacity of the aircraft's electrical system and wiring. This places significant stress on the relay contacts, motor, brake, and lamp, causing these components to suffer reduced service life. "Soft" starting of the motor, brake, and lamp is desirable to limit electromagnetic emissions and maximize the life of these components.

A retractable landing light may be installed into more than one model of aircraft. However, design differences between models of aircraft usually necessitate a change in the extension angle setting of the lighthead so that the lamp is properly aimed for a particular aircraft. This involves a time-consuming manual adjustment of position-control limit switches and repeated cycling of the retractable landing light. Means for pre-setting selectable extension angles for different models of aircraft is desired in order to reduce the amount of maintenance work required to install the retractable landing light into two or more models of aircraft.

Prior retractable landing lights utilize an open gearbox. Over time, exposure to the elements when the lighthead is extended causes a loss of gearbox lubrication. Low viscosity grease is used to counter this loss, but at the expense of gearbox efficiency, particularly at low temperature extremes.

Retractable landing lights inherently have a failure mode whereby the lighthead cannot be retracted. The aircraft cannot be dispatched in this condition, requiring maintenance personnel to remove and replace the retractable landing light. This can cause significant delays in the dispatch of the aircraft, particularly if the failure occurs at a remote location with limited maintenance capability. Although prior retractable landing lights have included manual retraction capability, the release mechanisms are slow and cumbersome.

Some improvements in remotely articulating aircraft lights have been made, such as Hamilton et al. U.S. Pat. No. 6,315,435 B1. However, Hamilton et al. teaches the use of potentiometers having wiping elements in contact with a resistive element. Potentiometers are subject to wear-out, limiting the service life of the aircraft light. Further, Hamilton does not teach how to preconfigure the operating envelope of an articulating light for different aircraft models, since the preset positions disclosed in Hamilton define only the operating envelope limits for the lighthead. Changes in the operating envelope to accommodate different aircraft models must be made by trial-and-error upon installation of the light into the aircraft. Also, Hamilton does not disclose how to reduce electromagnetic emissions and extend the service life of the motor brake and motor. In Metz et al., U.S. Pat. No. 5,355,131, an aircraft landing light utilizing contactless position sensing is taught. However, the position sensing disclosed in Metz does not accommodate reconfiguration of the operating envelope for different aircraft models, necessitating trial-and-error adjustment.

There is a need to limit inrush currents and eliminate the low-reliability relays and switches associated with retractable landing lights. There is also a need to provide a more reliable, precise, and easily reconfigurable means of controlling the position of the retractable landing light's lighthead. There is a further need to protect the gearbox from the elements. Finally, there is a need to provide capability for aircraft with failed retractable landing lights to delay repair and to dispatch with the failed light in place.

SUMMARY OF THE INVENTION

This invention is directed to an electronically controlled retractable landing light. The retractable landing light utilizes contactless absolute position sensing to detect the position of the lighthead. The retractable landing light also incorporates electronic control of the brake, motor, and lamp. An improved means of manually retracting the lighthead allows the aircraft to be dispatched in spite of a failure of the retractable landing light.

Specifically, the present invention includes filters to isolate electrical noise between the retractable landing light and the aircraft. A power supply is used to convert the power supplied by the aircraft to a level compatible with the retractable landing light. A power stage utilizes solid state switches with "soft-switching" capability to limit electrical stress on the solid-state switches when turning the brake, motor, and lamp on and off. This soft-switching capability reduces electromagnetic emissions from the brake, motor, and lamp, and extends the service life of these components. A control unit monitors mode and position command signals and lighthead position pre-sets. The control unit actuates the brake, motor, and lamp to move the lighthead to the commanded position, hold the lighthead in place, and turn the lamp on and off, depending on the mode selected. The control unit also provides proper, synchronized timing of the actuation of the brake, motor, and lamp to eliminate overlapping actuation of these devices for reduced electromagnetic emissions and to minimize the generation of switching transients on the aircraft electrical bus.

The present invention comprises an electronically controlled retractable light, comprising: means for mounting the retractable light; an electrical motor connected with said mounting means, said motor including a brake; means for reducing speed and amplifying torque coupled to said motor, said speed reducing and torque amplifying means being environmentally sealed; a lighthead connected movably with said mounting means and connected with said speed reducing and torque amplifying means, said lighthead including at least one lamp; contactless means for monitoring absolute position of said lighthead; at least one solid state switch, wherein said solid state switch slowly activates and deactivates; and a control unit communicating with said position monitoring means to: monitor the position of said lighthead; provide timed actuation of said brake, motor, and lamp to prevent simultaneous actuation of said brake, motor and lamp; and to stow said lighthead or position said lighthead at a predetermined angle.

These and other features will become better understood with reference to the following description, appended claims, and accompanying drawings.

DETAILED DESCRIPTION OF THE INVENTION

Figure 1:
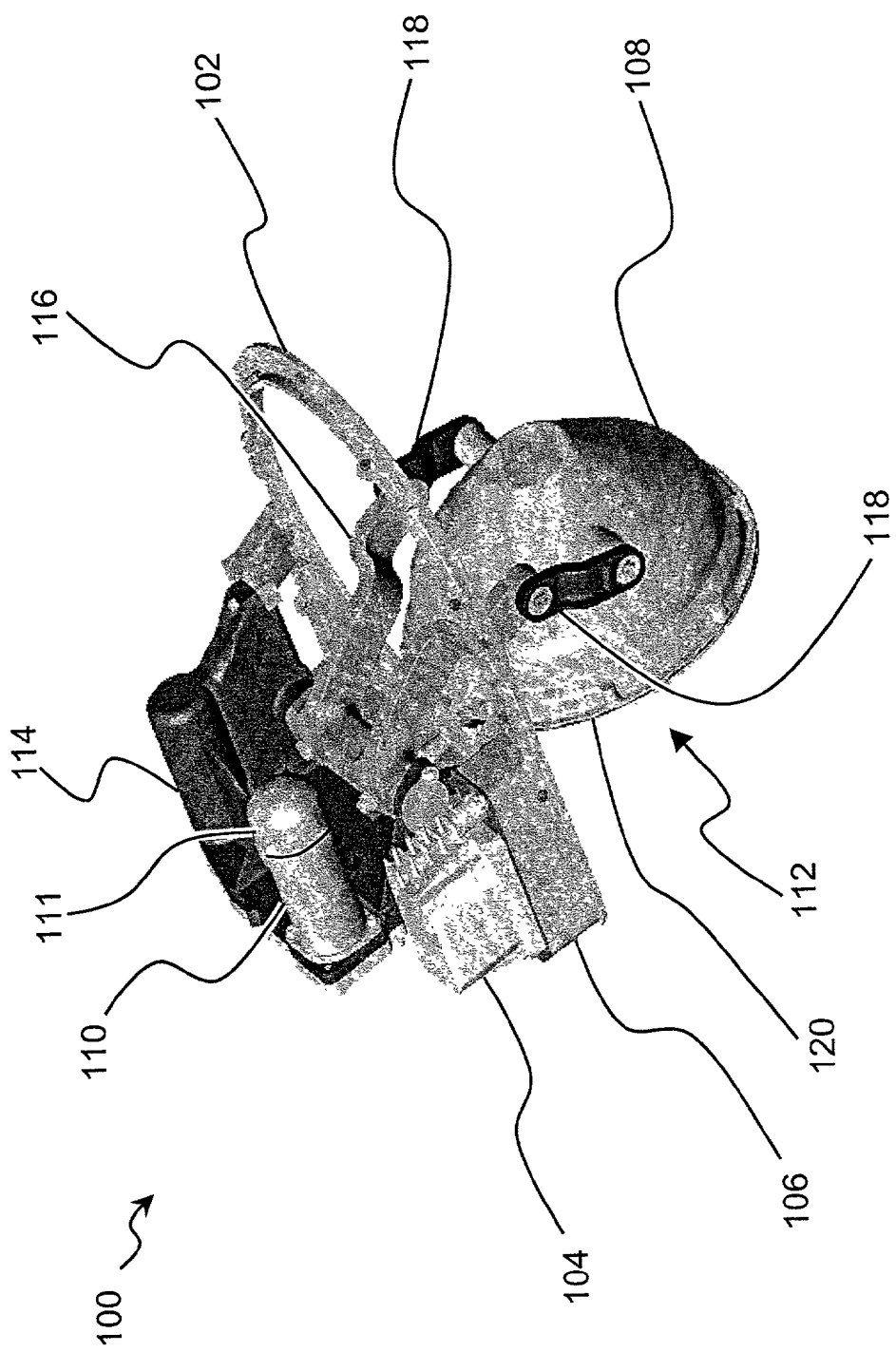
FIG. 1 shows the retractable landing light.

A retractable landing light 100 is shown in FIG. 1. A baseplate or mounting means 102 is a chassis and also facilitates mounting of the retractable landing light 100 into an aircraft. Power from the aircraft is converted to a level compatible with a lamp 112 by a transformer 104. A controller 106 monitors the position of a lighthead 108. The controller 106 also provides "soft start" solid-state power switching of a motor 110, a brake 111, and the lamp 112 to extend the life of the motor 110, brake 111, and lamp 112 and reduce electromagnetic emissions. In addition, the controller 106 may provide protection from fault conditions such as excessive current or over-temperature conditions, a stalled motor 110, and blockages to the lighthead 108. Further, the controller 106 easily facilitates changes to the setpoint of the lighthead 108 and the addition of new functions. The controller 106 may optionally include means for regularly flashing the lamp 112 on and off or from a higher voltage to a lower voltage to attract the attention of other aircraft operating in the vicinity, reducing the risk of runway incursions.

An environmentally sealed gearbox or other means for reducing speed and amplifying torque 114 converts the high-speed, low-torque output of the motor 110 to a low-speed, high-torque rotational mechanical drive. The output of gearbox 114 is coupled to means for driving and linking, such as a pair of drive arms 116 and connecting links 118, which provide leverage to move the lighthead 108 against the force of the airstream encountered by an aircraft in flight.

Vibration-damping gasketing 120 is placed between the lamp 112 and a lamp retainer 122. The vibration-damping gasketing 120 equally distributes the retaining force applied to the lamp 112 by lamp retainer 122, reducing the risk of failure of lamp 112 due to cracking of the glass envelope of lamp 112. Further, the vibration-damping gasketing 120 reduces mechanical stress on the filament of lamp 112 due to vibration, aiding to extend the service life of the lamp 112.

Figure 2:
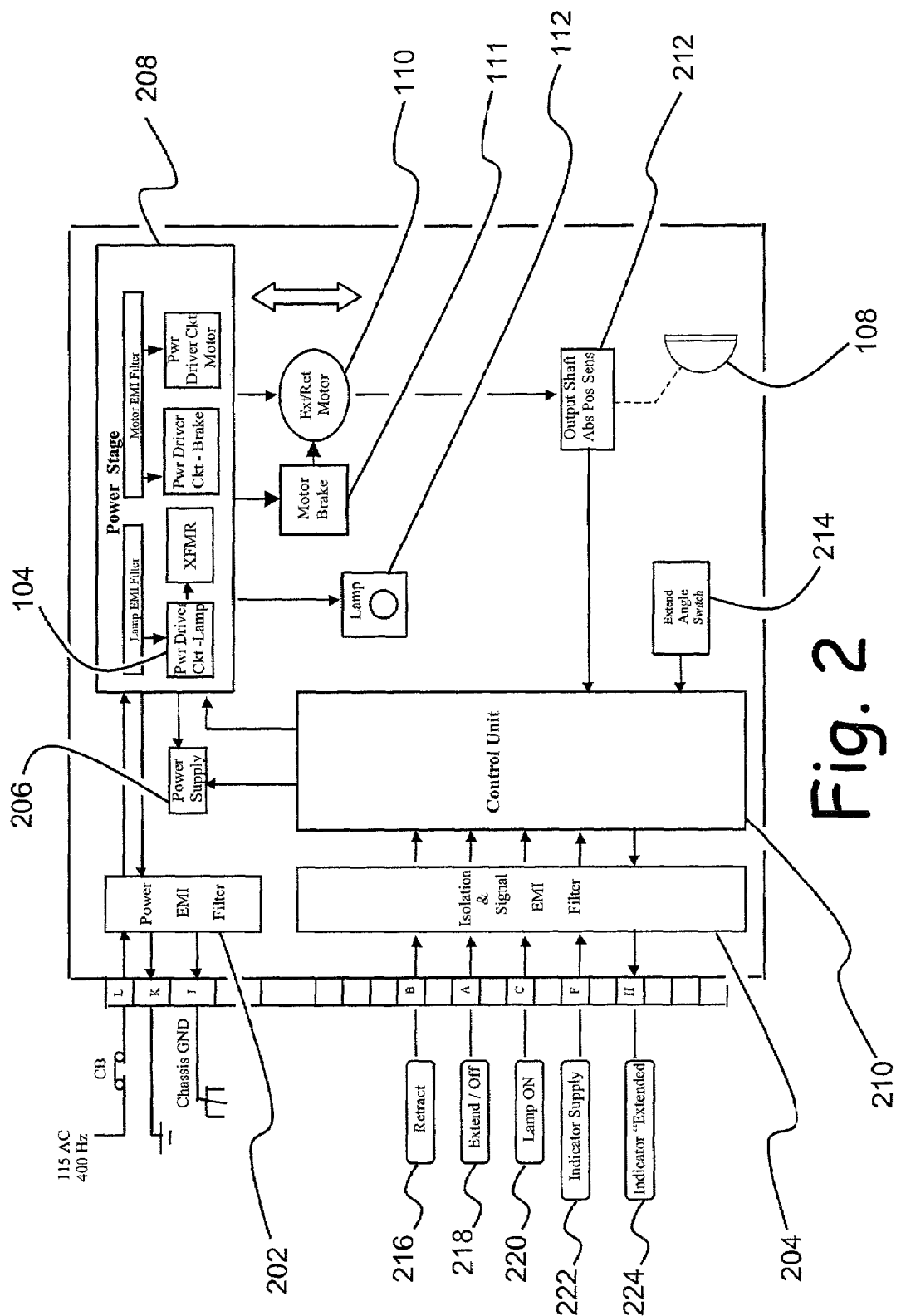
FIG. 2 is an electrical block diagram of the retractable landing light.

A block diagram of the electrical portion of the retractable landing light 100 is shown in FIG. 2. A set of filters 202 and 204 isolate electrical noise, such as electromagnetic interference, between the aircraft and a power supply 206, a power stage 208, and a control unit 210. The power supply 206 converts electrical power from the aircraft to a level compatible with the control unit 210 and the power stage 208. The position of the lighthead 108 is sensed by an absolute position sensor 212. Means for controlling such as the control unit 210 provides control functions, such as for example, turning the lamp 112 on and off, actuation of power to brake 111 and motor 110, setting the direction of rotation of the motor 110, and resolution of the position of the lighthead 108. The power stage 208 provides "soft start"

electrical drive for the brake 111, motor 110, and the lamp 112 to reduce electrical stress on brake 111, motor 110, and lamp 112 and to reduce electromagnetic emissions from the brake 111, motor 110, and lamp 112. The control unit 106 may also monitor for fault conditions, such as excessive current or over-temperature conditions, a stalled motor 110, and blockages to the lighthead 108. If a fault is detected, control unit 106 will disable power stage 208 until the fault is cleared.

The extend angle setting switch 214 is set to the desired position for a particular aircraft when the retractable landing light 100 is installed into the aircraft. The extend angle setting switch 214 provides selectable preset position commands to the control unit 210 for positioning the lighthead 108 to one or more predetermined extension angles (i.e., extension setpoints), eliminating the time-consuming step of manually calibrating the extension angle of lighthead 108 for a particular aircraft. Extend angle setting switch 214 may utilize one or more bits of digital logic, or may be an analog voltage level, such as derived from a voltage divider network. Means for monitoring the state of the extend angle setting switch 214, such as control unit 210, is configured such that the state of extend angle setting switch 214 represents a predetermined extension angle, or extension setpoint, for lighthead 108. Upon receiving an "Extend" command at terminal 218, control unit 210 will position the lighthead 108 at the extension angle represented by the state of extend angle switch 214.

Contactless means for monitoring absolute position 212, such as a Hall-effect rotary position sensor, is coupled to the lighthead 108 and provides the control unit 210 with continuous information on the angular extension position of the lighthead 108 so that the control unit 210 can control actuation of the brake 111, actuation of the motor 110, the direction of rotation of the motor 110, and illumination of the lamp 112 by appropriate synchronization of the on-off control of the power stage 208. Incremental-type position encoders may alternatively be used, but absolute-type position encoders are preferred because absolute-type position encoders do not require periodic calibration to an index position.

The retractable landing light 100 is commanded to extend or retract, and to switch the lamp 112 on and off, by means of control signals supplied to the control unit 210. To command the lighthead 108 to a stowed position when the retractable light 100 is not in use, an electrical control signal is applied to a "Retract" input terminal 216, causing the lighthead 108 to move to a predetermined stow position, preferably out of the airstream to minimize aerodynamic drag on the aircraft. To command the lighthead 108 to extend, an electrical control signal is applied to an "Extend" input terminal 218. To turn on the lamp 112, an electrical control signal is applied to a "Lamp On" terminal 220. The control unit 210 may optionally provide means for indicating to the flight crew that the lighthead 108 is in an extended position, such as a status output signal via a "Extended Indicator" terminal 224. The output signal present at terminal 224 is wired to an appropriate indication means in the cockpit, such as an indicator light or a caution and warning computer. The voltage level present at the "Extended Indicator" terminal 224 may be fixed at a level compatible with the associated cockpit indication means by connecting an appropriate voltage source to an "Indicator Supply" input terminal 222.

Figure 3:
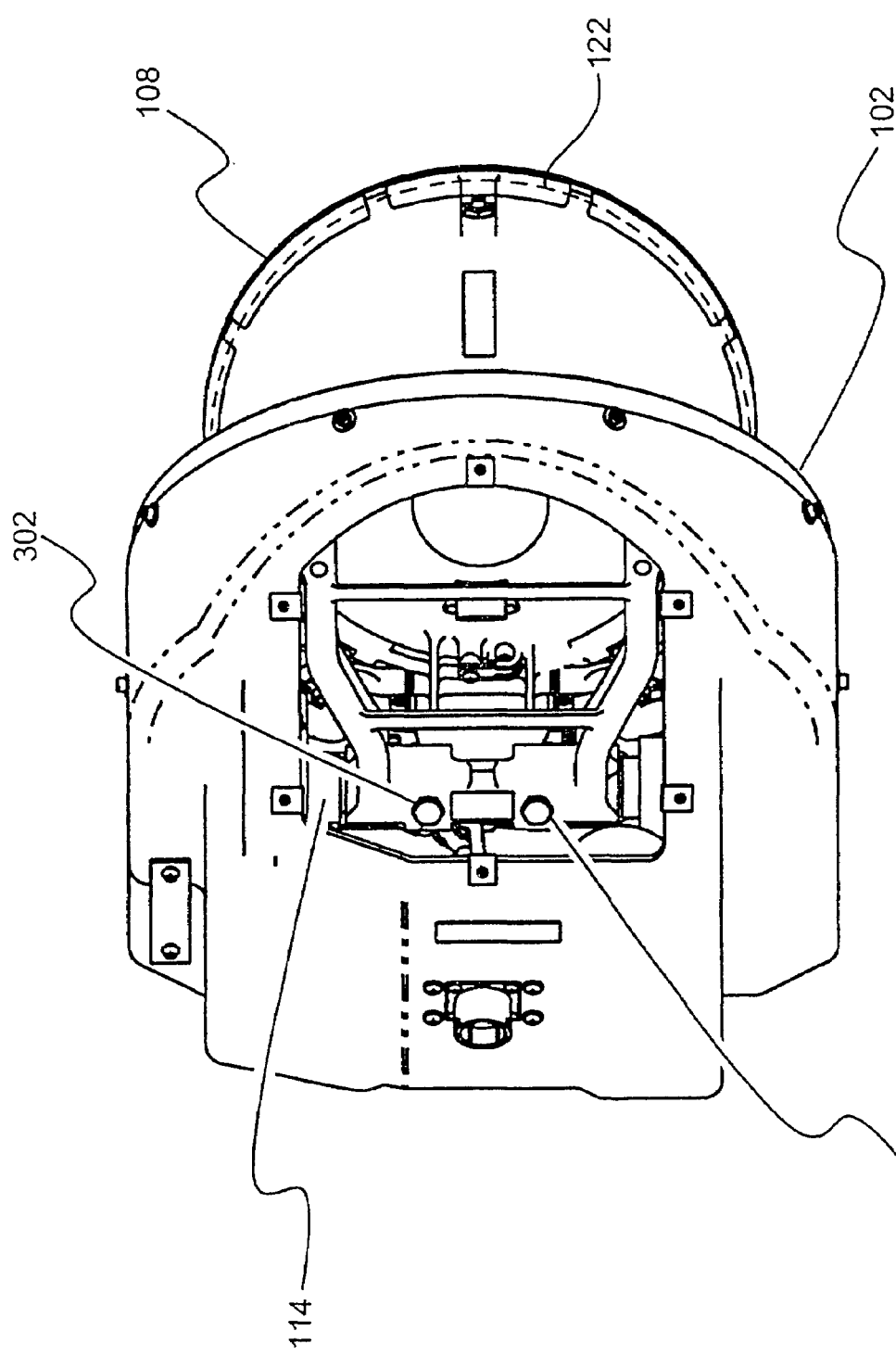
FIG. 3 is a detail of the manual retraction means.

If the lighthead 108 cannot be stowed due to a failure condition, the aircraft may not be permitted to dispatch due to operating limitations for the aircraft. The retractable landing light 100 may optionally include means for disengaging the lighthead 108 to manually stow the lighthead 108 as shown in FIG. 3 to overcome this limitation. The manual retraction means will allow the aircraft to dispatch under conditions where the lighthead 108 must be stowed but operation of the retractable landing light 100 is not required, such as daylight operations. To manually stow the lighthead 108, one or more release bolts 302 are removed. This disengages the drive arms 116 from the gearbox 114, allowing the lighthead 108 to be pivoted to the stowed position by pushing the lighthead 108 until the lighthead 108 is flush with the baseplate 102. The release bolts are then re-installed while holding the lighthead 108 in place, securing the lighthead 108 in the stowed position. The aircraft may then be dispatched.

In operation, the landing light 100 may be actuated by one of manual and automatic means. For manual operation, the flight crew commands the desired position for the retractable landing light 100 by means of a control switch remotely mounted in the cockpit. Alternatively, the command signal may be generated automatically, such as from an "air-ground" switch that senses whether or not the aircraft is in flight. When the controller 106 receives a command signal, the controller 106 compares the commanded position to the actual position of lighthead 108, using absolute position encoder 212. The controller 106 first actuates the brake 111 and then the motor 110, which in turn drives a speed reduction and torque amplification transmission means 114, such as a gearbox. The gearbox 114, which is sealed from exposure to the elements, converts the high-speed, low-torque output of the motor 110 into a low-speed, high-torque mechanical drive capable of extending the lighthead 108 against the force of the windstream encountered by an aircraft in flight. The gearbox 114 moves a drive arm 116, attached to the lighthead 108 by a set of connecting links 118, causing the lighthead 108 to extend or retract as needed until the proper position for the lighthead 108 is reached. The controller 106 controls power to the lamp 112, switching the lamp 112 on when the lighthead 108 is in an extended position and switching the lamp 112 off when the lighthead 108 is in a stowed position. The controller 106 provides a "soft start" turn-on of the lamp 112 by limiting inrush current, thereby extending the life of the lamp 112. The lighthead 108 further aids to increase the life of lamp 112 through the use of vibration-damping gasketing 120 to reduce mechanical stress on the lamp 112.

What is claimed is:

1. An electronically controlled retractable light, comprising:

means for mounting the retractable light;

an electrical motor connected with said mounting means, said motor including a brake;

means for reducing speed and amplifying torque coupled to said motor, said speed reducing and torque amplifying means being environmentally sealed;

a lighthead connected movably with said mounting means and connected with said speed reducing and torque amplifying means, said lighthead including at least one lamp;

a contactless means for monitoring absolute position of said lighthead;

at least one solid state switch configured to perform separate power switching events for said brake, motor, and lamp, respectively, wherein said at least one solid state switch performs the power switching events according to a soft switching scheme; and a control unit communicating with said position monitoring means and at least one solid state switch to: monitor the position of said lighthead; prevent simultaneous power switching events for said brake, motor and lamp; and to position said lighthead at a predetermined angle.

2. The electronically controlled retractable light of claim 1, further comprising an extend angle setting switch to set at least one extension setpoint for said lighthead.

3. The electronically controlled retractable light of claim 2, further comprising means to monitor the state of said extend angle setting switch.

4. The electronically controlled retractable light of claim 2, wherein
said control unit communicating further comprises means to monitor the state of said extend angle setting switch.

5. The electronically controlled retractable light of claim 1, wherein the means for reducing speed and amplifying torque include means for driving and linking, and said retractable light further comprising means for disengaging said means for driving and linking from said means for reducing speed and amplifying torque to manually stow said lighthead.

6. The electronically controlled retractable light of claim 1, wherein
said lighthead includes a lamp retainer, and vibration-damping gasketing is positioned between said lamp and said lamp retainer.

7. The electronically controlled retractable light of claim 1, wherein said control unit provides means for indicating to the crew when said lighthead is not in a stowed position.

8. The electronically controlled retractable light of claim 1, wherein said retractable lamp is actuated by one of manual and automatic means.

9. The electronically controlled retractable light of claim 1, further including means to regularly flash said lamp to attract attention.

10. The electronically controlled retractable light of claim 1, wherein said control unit is operable to monitor for over-current faults, over-temperature faults, stall of said motor, and blockages of said lighthead, and
wherein said control unit is operable to disable said solid state switches until said faults, motor stall, and blockages are no longer present.

11. The electronically controlled retractable light of claim 1, wherein said retractable light is an aircraft light.

12. A process for providing an electronically controlled, retractable light, comprising:
providing means for mounting the retractable light;
placing at said mounting means an electrical motor, said motor including a brake;
providing environmentally sealed means for reducing the speed and amplifying the torque of said motor;
movably connecting a lighthead to said mounting means and connecting said lighthead with said means for speed reducing and torque amplifying, said lighthead including at least one lamp;
performing separate power switching events for said brake, motor, and lamp, respectively, according to a soft switching scheme;
applying torque to said lighthead by way of said means for speed reducing and torque amplifying;
providing contactless means for monitoring absolute position of said lighthead;
providing means for controlling said lighthead in order to: monitor the position of said lighthead; prevent simultaneous power switching events for said brake, motor and lamp; and
stowing said lighthead or positioning said lighthead at a predetermined angle of extension.

13. The process of claim 12, further comprising providing at least one extension setpoint for said lighthead.

14. The process of claim 13, further comprising monitoring said extension setpoint.

15. The process of claim 12, further comprising providing said means for speed reducing and torque amplifying with means for driving and linking, and providing means for disengaging said means for driving and linking from said means for speed reducing and torque amplifying to manually stow said lighthead.

16. The process of claim 12, further comprising adding a lamp retainer to said lighthead and placing vibration-damping gasketing between said lamp and said lamp retainer.

17. The process of claim 12, further comprising providing means for indicating to the crew when said lighthead is not in a stowed position.

18. The process of claim 12, further comprising regularly flashing said lamp to attract attention.

19. The process of claim 12, further comprising
monitoring for at least one of over-current faults, over-temperature faults, stall of said motor, and blockages of said lighthead, and
disabling said motor, brake, and lamp until said at least one of over-current faults, over-temperature faults, motor stall, and blockages are no longer present.

20. A process for providing an electronically controlled, retractable light, comprising:
providing means for mounting the retractable light;
placing at said mounting means an electrical motor, said motor including a brake;
providing environmentally sealed means for reducing the speed and amplifying the torque of said motor;
movably connecting a lighthead to said mounting means and connecting said lighthead with said means for speed reducing and torque amplifying, said lighthead including at least one lamp;
supplying electrical power to said brake, motor, and lamp such that power to said brake, motor, and lamp can be slowly activated and deactivated;
applying torque to said lighthead by way of said means for speed reducing and torque amplifying;
providing contactless means for monitoring absolute position of said lighthead;
providing means for controlling said lighthead in order to: monitor the position of said lighthead; provide timed actuation of said brake, motor, and lamp to prevent simultaneous actuation of said brake, motor and lamp;
stowing said lighthead or positioning said lighthead at a predetermined angle of extension;
providing at least one extension setpoint for said lighthead wherein said extension setpoints include a setting for positioning said lighthead at a stowed position;
monitoring said extension setpoint; and
providing said means for speed reducing and torque amplifying with means for driving and linking, and providing means for disengaging said means for driving and linking from said means for speed reducing and torque amplifying to manually stow said lighthead.

21. The process of claim 20, further comprising:
adding a lamp retainer to said lighthead and placing vibration-damping gasketing between said lamp and said lamp retainer; and
providing means for indicating to the crew when said lighthead is not in a stowed position.

22. A method for electronically controlling a mounted retractable light, which is provided with a mounted electrical motor including a brake and a movably connected lighthead including a lamp, comprising:
- performing separate power switching events for said brake, motor, and lamp, respectively, where the power switching events are performed in such a manner as to gradually or switch off electrical power to the brake, motor, and lamp using soft switching;
- monitoring absolute position of the lighthead; and
- controlling actuation of the brake, motor, and lamp so as to prevent simultaneous power switching events for the brake, motor and lamp.

23. The method of claim 22, further comprising:
- setting a plurality of angle extension setpoints for positioning the lighthead, the angle extensions setpoints including a setpoint corresponding to a stowed position for the lighthead; and
- selecting one of a plurality of position commands corresponding to the extension setpoints in order to position the lighthead at a desired extension setpoint.

24. The method of claim 22, wherein the monitoring step is performed without the use of contacts.

25. The method of claim 22, further comprising reducing speed and amplifying torque of the electrical motor output using an environmentally sealed device.

26. A device for electronically controlling a mounted retractable light, which is provided with a mounted electrical motor including a brake and a movably connected lighthead including a lamp, comprising:
- means for performing separate power switching events for said brake, motor, and lamp, respectively, wherein the power switching events are performed in such a manner as to gradually supply and switch off electrical power to the brake, motor, and lamp using soft switching;
- means for monitoring absolute position of the lighthead; and
- means for controlling actuation of the brake, motor, and lamp so as to prevent simultaneous power switching events for the brake, motor and lamp.

* * * * *